ered with its pile preparatory to the first pass.
UNITED STATES PATENT OFFICE.

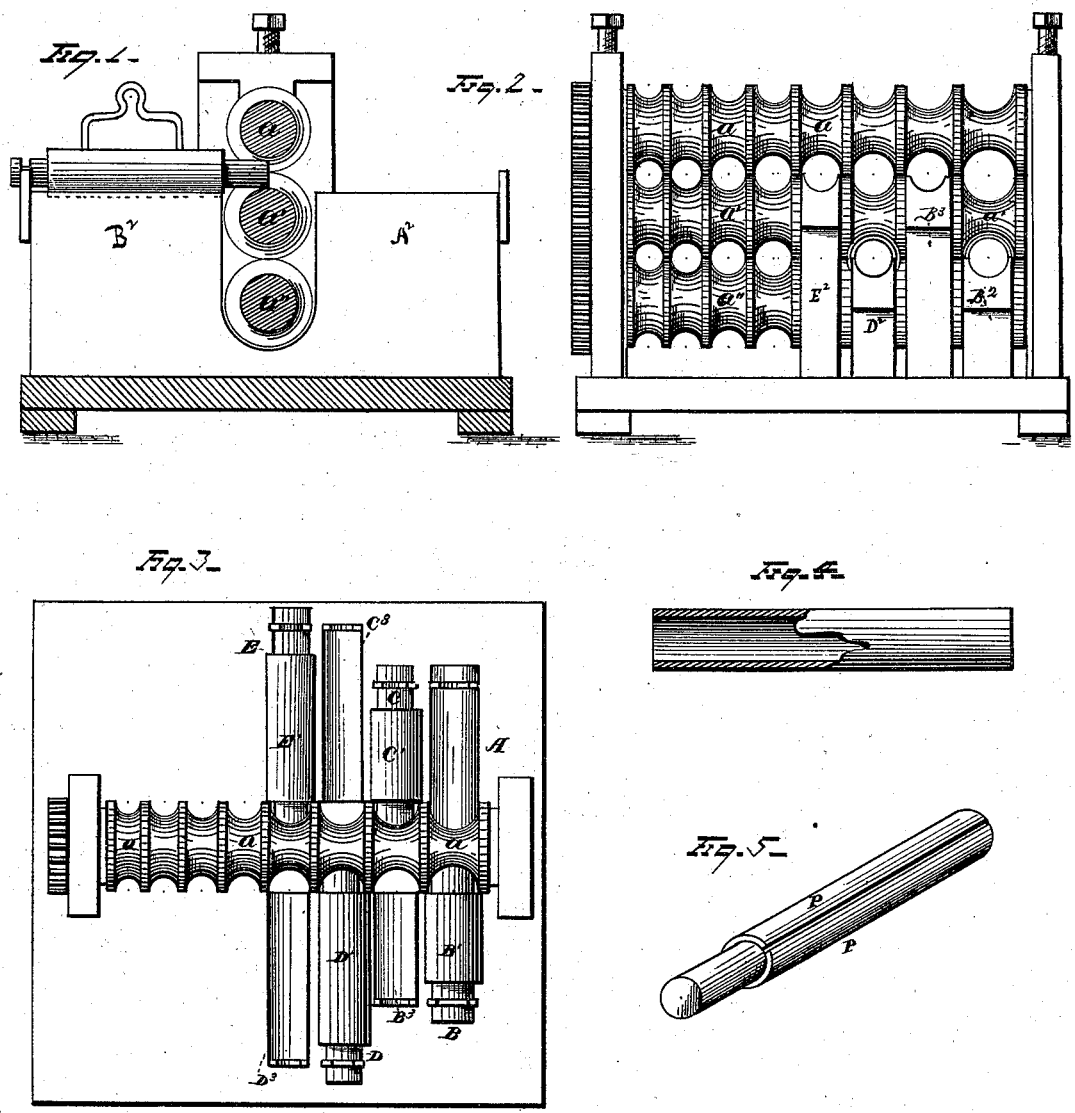

GEORGE J. LE VAKE, OF CLEVELAND, OHIO, ASSIGNOR, BY MESNE ASSIGNMENTS, TO JOSHUA E. HALL, CLARA C. LE VAKE, AND JAMES M. LE VAKE, OF SAME PLACE.

IMPROVEMENT IN MACHINERY FOR MAKING HOLLOW METAL BARS.

Specification forming part of Letters Patent No. 176,972, dated May 2, 1876; application filed April 6, 1876.

*To all whom it may concern:*

Be it known that I, GEORGE J. LE VAKE, of Cleveland, in the county of Cuyahoga and State of Ohio, have invented certain new and useful Improvements in Machinery for Making Hollow Metal Bars, Rods, &c.; and I do hereby declare the following to be a full, clear, and exact description of the invention, such as will enable others skilled in the art to which it pertains to make and use it, reference being had to the accompanying drawings, which form part of this specification.

My invention relates to machinery for the manufacture of hollow bars of metal by a process of rolling.

In the drawings, Fig. 1 represents in cross-section a machine embodying my invention. Fig. 2 represents a side elevation of the same; Fig. 3, a plan view of the same; Fig. 4, a view, part in side elevation and part in longitudinal section, of the product of said machine. Fig. 5 shows the initial mandrel clothed with its pile preparatory to the first pass.

My invention consists of the following parts and combinations, as hereinafter specified and claimed, wherein $a$ $a^1$ $a^2$ are rolls of the three-high description, suitably mounted and operating in the required frames and journals. These rolls are suitably geared or otherwise connected together so as to operate in the ordinary manner of three-high rolls. The grooves formed by the union of the rolls may present either a circular pass, as shown in the drawings, or said pass may be octagonal, hexagonal, or square, as may be desired, according to the fashion of the required product. A B C D E are mandrels, A C E having cavities in one end, and B D round projections fitting within said cavities $B^1$ $C^1$. $B^1$, $C^1$, $D^1$, and $E^1$, are tubes or barrels surrounding and incasing their respective mandrels. $A^2$, $B^2$, $B^3$, $C^3$, $D^2$, $D^3$, and $E^2$, are grooved or recessed standards for the purpose of supporting their respective mandrels and tubes. Each mandrel is provided at or near its rear end with a groove or equivalent thereof, which, in combination with a suitable stop-piece, shall operate to retain said mandrel in its position and prevent it from longitudinal movement, while the manner of joining opposing mandrels, as hereinbefore mentioned, results during operation to retain the mandrels in proper relation to each other and to prevent undue lateral movement.

The parts just described constitute the essential components of a machine according to my invention. I do not limit myself to any precise construction, such as herein shown, inasmuch as the mandrels may be shaped round or otherwise, as may be desired, and any suitable rest and stop mechanism may be applied to support the mandrels and their tubes or barrels, and to retain them in proper relation and position.

I prefer to form the mouths of the tubes or barrels somewhat bell or trumpet shaped for the purpose of more readily and certainly receiving the hollow pile between it and its mandrel; and, for the purpose of handling, each tube may be provided with a suitable eye or handle, by which it may be lifted and transferred from rest to rest, as desired, and as will hereinafter more fully appear.

The operation of my device is as follows: The mandrel A is first clothed with a hollow pile, consisting of two or more longitudinal sections of a cylinder, as shown in Fig. 5 of the drawings, the hollow pile being there represented by the letters P P. Thus clothed, the mandrel A is placed upon its grooved rest $A^2$, and the pile is drawn through the first pass of the rollers, by which process the sections heretofore mentioned are perfectly welded together, and passed through around the mandrel B, between said mandrel and its tube or barrel $B^1$. The mandrel B and tube $B^1$, with their contained pile, are then lifted and placed upon the standard $B^3$, and are received by the second pass of the rollers. The pile now clothing the mandrel C is held between said mandrel and its tube C, the mandrel C, tube $C^1$, and the pile are now lifted and transferred to the rest $C^3$, where the pile is received by the third pass of the rolls, and transferred to the mandrel D, between said mandrel and its tube or barrel $D^1$. The mandrel D, tube $D^1$, and the pile are now transferred to the rest $D^3$, and received, through the fourth pass of the rollers, upon the mandrel E, between said mandrel and its tube E¹. It will be observed that each pass is smaller in its sectional area than the preceding pass, and that each succeeding mandrel also diminishes in diameter while it increases proportionately in length.

In this manner the pile with its mandrel and tube or barrel is transferred from pass to pass until it has acquired the required dimensions. The product is a hollow bar having such fashion, as to its exterior and bore, as is determined by the shape of the mandrels and grooves of the rolls.

It is understood that my invention is not limited to three-high rolls, as two-high rolls or three-high rolls, or a train of rolls, may be employed, as desired, the rolls, *per se*, forming no part of my invention.

By the employment of the tubes or barrels herein mentioned the pile is prevented from too rapidly cooling, so that the product can be obtained by a single heating of the pile, whereas in all the devices of this nature of which I am aware it is necessary to heat the pile two or three times during the process of rolling, and before its completion.

What I claim is—

1. The opposing mandrels A B, constructed to be united by means of a cavity in the end of one mandrel and a corresponding projection on the end of the other, substantially as and for the purpose set forth.

2. In combination with opposing mandrels, constructed to be united as described, of the rests A² B², provided with suitable stops for retaining the mandrels in position, substantially as and for the purpose set forth.

3. The combination of opposing mandrels, constructed to be united as described, with grooved rests A² B², and tubes or barrels B¹ C¹, substantially as and for the purpose set forth.

4. The tube or barrels B¹ C¹, constructed with a bell or trumpet shaped end for receiving the pile, substantially as and for the purpose set forth.

5. The tubes B¹ C¹, provided with a handle for lifting it, and its contained pile and mandrel from one pass to another, substantially as and for the purpose set forth.

6. An improved machine for manufacturing hollow bars, consisting essentially of suitable rolls, standards, or rests, represented by A² B³ B, mandrels represented by A B C, and tubes or barrels represented by B¹ C¹, substantially as and for the purpose described.

In testimony whereof I have signed my name to this specification in the presence of two subscribing witnesses.

GEORGE J. LE VAKE.

Witnesses:
 FRANCIS TOUMEY,
 JAMES P. WALSH.